United States Patent [19]

Diedrich

[11] Patent Number: 4,900,364
[45] Date of Patent: Feb. 13, 1990

[54] PAINT REMOVAL SYSTEM

[76] Inventor: James G. Diedrich, 1030 Upper Ridgeway, Elm Grove, Wis. 53122

[21] Appl. No.: 238,897

[22] Filed: Aug. 31, 1988

Related U.S. Application Data

[63] Continuation-in-part of Ser. No. 175,771, Mar. 31, 1988, abandoned.

[51] Int. Cl.$^4$ .................. C11D 10/00; C11D 3/14; B08B 7/00
[52] U.S. Cl. .......................... 134/4; 134/26; 134/38; 252/156; 252/174.23; 252/DIG. 3; 252/DIG. 8
[58] Field of Search .............. 134/26, 40, 38, 4, 7; 252/DIG. 8, DIG. 3, 79.5, 160, 156, 174.23; 156/655, 635, 636, 638, 654, 656

[56] References Cited

U.S. PATENT DOCUMENTS

| 3,950,185 | 4/1976 | Toyama et al. | 252/DIG. 8 |
|---|---|---|---|
| 4,285,827 | 8/1981 | Wyatt | 134/38 X |
| 4,477,288 | 10/1984 | Kazmierczak et al. | 134/38 X |
| 4,579,627 | 4/1986 | Brailsford | 252/DIG. 8 X |
| 4,643,840 | 2/1987 | Brocklehurst et al. | 252/DIG. 8 |
| 4,734,138 | 3/1988 | Ely et al. | 134/38 X |
| 4,801,397 | 1/1989 | Flanagan et al. | 252/DIG. 8 |
| 4,844,833 | 7/1989 | Komatsu et al. | 252/DIG. 8 |

Primary Examiner—David L. Lacey
Assistant Examiner—Thi Dang
Attorney, Agent, or Firm—Foley & Lardner

[57] ABSTRACT

A method for stripping cured paint from a surface using a stripper composition containing a caustic alkali and a film forming liquid coating which is sprayed on the stripper composition to form a film on the surface of the stripper composition, the liquid coating containing a volatile thinner and a parafin formulation or a liquid vinyl-solvent, the coating being separable from the stripper composition to allow for removal of the composition and softened paint by scrapping or washing with a high pressure water wash. A further method is to mix a solvent free liquid vinyl coating with a stripper composition and an additive to form a homogeneous mixture that can be sprayed onto the cured paint and removed by peeling to remove the softened paint.

3 Claims, No Drawings

PAINT REMOVAL SYSTEM

RELATED APPLICATION

This application is a continuation-in-part of my application Ser. No. 175,771 filed March 31, 1988, entitled "Paint Removal System", now abandoned.

FIELD OF THE INVENTION

The present invention relates to methods for removing cured coatings of paint, varnish or the like from surfaces containing said coatings and more particularly to a method for forming a thin film coating over a paint remover to prolong the action of the stripper composition.

DESCRIPTION OF THE ART

A number of systems are presently available for removing cured paint from wall surfaces and the like. These systems commonly used a stripper composition which is commercially available. Such compositions use a caustic alkali ingredient in the composition to enhance the paint stripping capabilities. It is generally well known that the composition contain materials that evaporate quickly and must be covered in order to prolong the active life of the composition.

In U.S. Pat. No. 4,579,627 entitled "Paste Stripper System For Surfaces" issued on Apr. 1, 1986, and 4,426,250 entitled "Stripper System for Surfaces" issued Jan. 17, 1984, systems are described which utilize a cover or blanket to cover the exposed surface of the stripper composition. The cover includes a fibrous layer which is permeable so that it will adhere to the stripper composition and an impermeable layer to prevent or retard the rate of evaporation of the composition materials. The cover is designed to facilitate removal of the stripper composition when the cover is removed by the adherence of its fibrous layer to the stripper composition. The cover or blanket peels the paint composition from the surface of the structure. The cover is heavy and bulky making it difficult to handle. In U.S. Pat. No. 4,643,840 entitled "Paint Stripper Compositions" issued Feb. 17, 1987, the composition includes a fibrous material or a xanthan gum and hectorite clay which are applied to the surface by a trowel or spreader which is time consuming and expensive.

SUMMARY OF THE INVENTION

The paint stripper system, according to the present invention, includes a liquid film forming coating and a method for applying the coating to the paint remover composition which is inexpensive and easy to apply. This is accomplished by spraying the film forming coating onto the surface of the stripper composition to form a thin shield over the surface of the stripper composition.

One of the primary features of the present invention is the ability to spray the coating onto the stripper composition quickly and easily by conventional spraying equipment. The coating dries quickly in air to form a thin shield.

Another feature of the present invention is the ability to remove the coating from the stripper composition which is then exposed for easy removal either by scraping or by a pressurized water wash.

Another feature of the invention is the ability to mix the coating material with the stripper composition and additive to form a homogeneous mixture which can be sprayed onto the painted surface and later removed simultaneously.

Another feature of the invention is the ability to quickly and easily spray the liquid film forming material around irregular surfaces.

Other principal features and advantages of the invention will become apparent to those skilled in the art upon review of the following detailed description, claims and drawings.

DETAILED DESCRIPTION OF THE INVENTION

In accordance with the invention a paint stripper composition is provided which is adapted to being directly applied to the coated surface which is intended to be stripped. The paint stripper composition is a conventional material and generally includes a caustic alkali, preferrably potassium hydroxide. A typical composition which could be used for this purpose is Diedrich 606 and/or 606X Multilayer Paint Remover made by Diedrich Chemicals Restoration Technologies, Inc. of Oak Creek, Wisconsin.

After application of the stripper composition to the coated surface, means is provided for covering the surface of the stripper composition. Such means is in the form of a liquid coating which forms a film over the surface of the stripper composition and thus prevents evaporation of the composition. The covering means can take the form of a liquid synthetic coating or a liquid vinyl-solvent coating both of which form a thin film on the surface of the composition. In each case, the liquid covering means can be sprayed directly onto the surface of the stripper composition and left on the surface for a period of 24 to 48 hours.

The synthetic coating contains by weight 15% solids such as a parafin formulation and 85% volatile thinner such as mineral spirits. It can also be sprayed on the surface of the stripper composition and left on for 24 to 48 hours. The material should be clear before applying and if cloudy, should be warmed or placed in a heated area overnight. It should be applied when air temperature is 50° F. or higher for best results. A typical coating is Diedrich Spray Activator I made by Diedrich Chemicals Restoration Technologies, Inc. The clear synthetic coating is unaffected by ultra-violet rays, provides a physical barrier to ambient pollutants and moisture penetration. The coating can be removed separately or removed with the stripper composition by pressurized water as described above.

The liquid vinyl-solvent coating is sprayed on the surface of the stripper composition to form a film having a thickness of 3-4 mils. The film forming coating will dry within 30 minutes. The film forming coating is a conventional product such as Diedrich Poly-Spray Activator II made by Diedrich Chemicals Restoration Technologies, Inc. and contains a ketone or toluol solvent and chlorinated parafin. After the stripper composition has penetrated the coated surface, the film forming coating can be removed by simply peeling it off of the stripper composition, or it can be removed along with the stripper composition by scraping or using pressurized water to wash the composition and paint off of the surface.

The film forming coatings act as vapor barriers to retarding evaporation or drying of the stripper composition. The coatings help to retard, if not eliminate, sagging or runoff of the composition and act as a safety barrier so that workers or passersby cannot come in contact with the stripper composition.

The above systems are applicable for removal of paint on the exterior of a building. If paint is to be removed from the interior of a building a covering means in the form of a solvent free liquid is mixed with the stripper composition to form a homogeneous mixture. A typical solvent free liquid of this type is Diedrich Polyspray Activator III, made by Diedrich Chemicals Restoration Technologies, Inc. The solvent free liquid is in the form of a water based liquid-vinyl which is mixed with the stripper composition and an additive selected from out of the following: Magnesium oxide or carbonate or calcium oxide or carbonate. This composition includes 10% by volume liquid vinyl, 40% additive and 50% stripper composition. This ratio will vary depending on the number of coats of paint to be removed. The amount of stripper composition being increased as the number of layers of paint increases. This homogeneous mixture is non-flameable, has a mild pleasant odor and contains no solvents.

The homogeneous mixture is then applied directly to the surface of the paint by spraying or rolling directly onto the painted surface. A film will form on the surface of the paint which can then be left on the surface for 24 to 48 hours depending on the number of layers of paint to be removed. The film and softened paint are removed by peeling the film and paint from the surface as a unit.

Thus, it is apparent that there has been provided in accordance with the present invention, a method for removing cured paint from a surface that freely satisfies the aims and advantages set forth above. While the invention has been described in conjunction with specific embodiments thereof, it is evident that many alternatives, modifications and variations will be apparent to those skilled in the art. Accordingly, it is intended to embrace all such alternatives, modifications and variations as fall within the spirit and broad scope of the appended claims.

I claim:

1. A method for stripping a cured surface coating of paint from a surface, said method comprising the steps of:
   applying a potassium hydroxide stripper composition to the cured surface coating of paint,
   spraying a clear liquid-vinyl film over the surface of the stripper composition to form a thin vinyl coating on the surface of the stripper composition to prevent drying of said composition,
   permitting said stripper composition to react with and decompose said surface coating of paint,
   peeling the vinyl coating from the surface of said stripper composition, and
   removing the stripper composition and coating of paint from the surface by scraping or spraying water under pressure on said stripper composition.

2. The method according to claim 1 wherein said removing step includes the step of scraping the composition and paint from the surface.

3. The method according to claim 1 wherein the removing step includes the step of spraying with high pressure water.

* * * * *